(12) United States Patent
Li et al.

(10) Patent No.: US 11,196,494 B2
(45) Date of Patent: Dec. 7, 2021

(54) INTERFERENCE POWER MEASUREMENT METHOD AND DEVICE (71) Applicant: HUAWEI TECHNOLOGIES CO., LTD., Guangdong (CN)

(72) Inventors: Xueru Li, Beijing (CN); Ruiqi Zhang, Beijing (CN); Di Zhang, Beijing (CN); Yongxing Zhou, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/714,550

(22) Filed: Dec. 13, 2019

(65) Prior Publication Data
US 2020/0119822 A1 Apr. 16, 2020

Related U.S. Application Data (63) Continuation of application No. PCT/CN2018/090494, filed on Jun. 8, 2018.

(30) Foreign Application Priority Data

Jun. 16, 2017 (CN) .......................... 201710459078.3

(51) Int. Cl.
*H04B 17/345* (2015.01)
*H04B 7/0413* (2017.01)
(Continued)

(52) U.S. Cl.
CPC ......... *H04B 17/345* (2015.01); *H04B 7/0413* (2013.01); *H04B 7/0626* (2013.01);
(Continued)

(58) Field of Classification Search
CPC ..... H04L 5/0048; H04L 5/005; H04L 5/0057; H04L 1/00; H04L 1/0026; H04L 5/0094;
(Continued)

(56) References Cited

U.S. PATENT DOCUMENTS 10,645,711 B2 * 5/2020 Li ....................... H04W 72/042
2010/0254471 A1 10/2010 Ko et al.
(Continued)

FOREIGN PATENT DOCUMENTS

CN 102300244 A 12/2011
CN 102422657 4/2012
(Continued)

OTHER PUBLICATIONS

Ericsson:"on CSI acquisition and reporting", 3GPP Draft; R1-1708685,May 6, 2017 (May 6, 2017), XP051262582, total 6 pages.
(Continued)

*Primary Examiner* — Ivan O Latorre
(74) *Attorney, Agent, or Firm* — Womble Bond Dickinson (US) LLP (57) ABSTRACT

An interference power measurement method and a device are provided. The method includes: receiving, by a terminal, first signaling that carries first indication information, where the first indication information is used to indicate n first channel state information-reference signal CSI RS resources, and a $j^{th}$ first CSI RS resource is associated with a power parameter $P_{c,j}$; and sending, by the terminal, a channel quality indicator CQI, where the CQI is determined based on a total interference power. The total interference power is a linear weighting result of an interference power measured on each of the n first CSI RS resources and an interference power $I_0$ measured on a zero power CSI RS resource. A weighting coefficient of an interference power $I_j$ measured on the $j^{th}$ first CSI RS resource is a function of the power parameter $P_{c,j}$, and a weighting coefficient of $I_0$ is a function of (Continued)

$$1 - \sum_{j=1}^{n} P_{c,j}.$$

30 Claims, 4 Drawing Sheets (51) Int. Cl.
 H04B 7/06 (2006.01)
 H04L 5/00 (2006.01)
 H04W 52/24 (2009.01)
 H04W 72/04 (2009.01)
(52) U.S. Cl.
 CPC ......... *H04B 7/0632* (2013.01); *H04L 5/0048* (2013.01); *H04W 52/243* (2013.01); *H04W 72/042* (2013.01)
(58) Field of Classification Search
 CPC .. H04B 17/345; H04B 7/0413; H04B 7/0626; H04B 7/0632; H04W 52/243; H04W 72/042; H04W 72/04; H04W 24/10
 See application file for complete search history.

(56) References Cited

U.S. PATENT DOCUMENTS

| | | | | |
|---|---|---|---|---|
| 2012/0213261 A1* | 8/2012 | Sayana | ............... | H04L 5/0094 375/224 |
| 2013/0208604 A1* | 8/2013 | Lee | ............... | H04B 7/0626 370/252 |
| 2013/0336214 A1* | 12/2013 | Sayana | ............... | H04B 7/063 370/328 |
| 2014/0010126 A1 | 1/2014 | Sayana et al. | | |
| 2014/0113677 A1* | 4/2014 | Parkvall | ............... | H04W 52/242 455/522 |
| 2015/0215905 A1* | 7/2015 | Park | ............... | H04W 76/00 370/329 |
| 2016/0112177 A1* | 4/2016 | Zheng | ............... | H04W 72/082 370/330 |
| 2016/0135147 A1* | 5/2016 | Ouchi | ............... | H04W 72/042 370/329 |
| 2016/0301515 A1* | 10/2016 | Ouchi | ............... | H04W 72/1226 |
| 2018/0183556 A1* | 6/2018 | Shin | ............... | H04L 5/0051 |
| 2018/0220433 A1* | 8/2018 | Li | ............... | H04W 72/082 |
| 2018/0248607 A1* | 8/2018 | Park | ............... | H04B 7/0632 |
| 2018/0254813 A1* | 9/2018 | Gao | ............... | H04B 7/0632 |
| 2019/0281487 A1 | 9/2019 | Liu et al. | | |
| 2019/0312623 A1* | 10/2019 | Park | ............... | H04B 7/0456 |
| 2019/0341981 A1* | 11/2019 | Park | ............... | H04B 7/0639 |

FOREIGN PATENT DOCUMENTS

| | | |
|---|---|---|
| CN | 104219724 A | 12/2014 |
| CN | 104620627 | 5/2015 |
| CN | 105052061 | 11/2015 |
| CN | 105991244 | 10/2016 |
| EP | 2518919 A2 | 10/2012 |

OTHER PUBLICATIONS

Qualcomm Incorporated:"Details of CSI framework",3GPP Draft; R1-1708589,May 14, 2017 (May 14, 2017), XP051273780,total 6 pages.

* cited by examiner

INTERFERENCE POWER MEASUREMENT METHOD AND DEVICE

CROSS-REFERENCE TO RELATED APPLICATIONS

This application is a continuation of International Application No. PCT/CN2018/090494, filed on Jun. 8, 2018, which claims priority to Chinese Patent Application No. 201710459078.3, filed on Jun. 16, 2017. The disclosures of the aforementioned applications are herein incorporated by reference in their entireties.

TECHNICAL FIELD

This application relates to the field of wireless communications technologies, and in particular, to an interference power measurement method and a device.

BACKGROUND

Before transmitting downlink data to a terminal, a network device needs to determine a modulation and coding scheme (MCS) to be used for the to-be-transmitted downlink data, and add a modulated and coded symbol to a physical downlink shared channel (PDSCH). An appropriate MCS can ensure data transmission performance. In a wireless communications system, an MCS may be determined based on a channel quality indicator (CQI) fed back by a terminal. If the CQI fed back by the terminal can relatively accurately reflect an actual received signal to interference plus noise ratio (SINR) of downlink data that is subsequently sent to the terminal by a network device, the network device can determine an appropriate MCS based on the CQI.

In a multiple input multiple output (MIMO) system, a network device may simultaneously send downlink data to a plurality of terminals on a same time-frequency resource. When the network device transmits data to a terminal on a configured time-frequency resource, another terminal that simultaneously transmits data to the network device on the same time-frequency resource is referred to as a paired terminal of the terminal. Although the network device may precode data to minimize interference between the different terminals, data precoding is unable to completely eliminate the interference between the different terminals. As a result, data received by the terminal is interfered by data that is sent to the paired terminal device of the terminal by the network device. This is referred to as multi-user interference. In addition, interference to the terminal may also be caused when a network device in another cell transmits data to a terminal served by the network device in the another cell. This is referred to as inter-cell interference. Therefore, when measuring a CQI, the terminal needs to consider the multi-user interference caused by the paired terminal device of the terminal and the inter-cell interference caused when the network device in the another cell transmits data to another terminal device.

To measure an interference power of a paired user, a network device configures a channel state information interference measurement (CSI IM) resource for a terminal. The CSI IM resource is a non zero power channel state information-reference signal (NZP CSI RS) time-frequency resource. The CSI IM resource is the same as a time-frequency-code resource that is occupied by a CSI RS and that is used by a paired terminal of the terminal for measuring a channel coefficient. To be specific, the paired terminal of the terminal measures, on the resource, the CSI RS sent to the paired terminal of the terminal by the network device, and estimates the channel coefficient. The terminal measures, on the resource, a power of interference caused to the terminal by the paired terminal of the terminal. When the terminal has a plurality of paired terminals, the network device needs to configure a plurality of NZP CSI RS resources as CSI IM resources for the terminal, to respectively measure interference powers of the different paired terminals.

Figure 1:
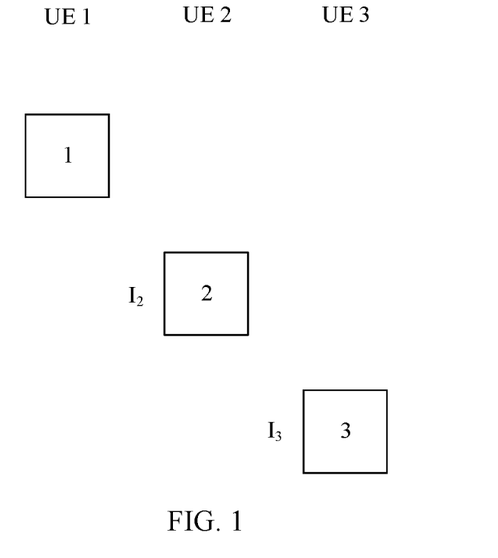
FIG. 1 is a schematic diagram of a CSI IM resource configured for a terminal by a network device according to the background of this application.

As shown in FIG. 1, a network device transmits downlink data to UE 1, UE 2, and UE 3 on a same time-frequency resource. That is, the UE 1, the UE 2, and the UE 3 are paired on the time-frequency resource. It is assumed that a CSI RS resource configured for UE k by the network device is a $k^{th}$ NZP CSI RS resource, where k=1, 2, 3, and the UE k measures an NZP CSI RS sent on the $k^{th}$ NZP CSI RS resource by the network device, and estimates a channel coefficient from the network device to the UE k. CSI IM resources configured for the UE k by the network device are NZP CSI RS resources respectively corresponding to the other two UEs, and are used to respectively measure powers of interference caused to the UE k by the other two UEs. For example, the UE 1 measures, on a second NZP CSI RS resource, a power $I_2$ of interference caused to the UE 1 by the UE 2. Similarly, the UE 1 measures an interference power $I_3$ of the UE 3. A total interference power of the paired terminals is $I_{UE1}=I_2+I_3$.

However, in addition to interference caused by a paired terminal, sending data or a reference signal by a network device in another cell also causes interference to a terminal. Such type of interference is referred to as inter-cell interference, and this type of interference is entirely counted when the terminal measures an interference power of the paired terminal. Using FIG. 1 as an example, the interference power measured on the second NZP CSI RS time-frequency resource by the UE 1 is actually a sum of an interference power of the UE 2 and an inter-cell interference power, that is, $I_2=y_2+I_0$, where $y_2$ is the interference power of the UE 2, and $I_0$ is the inter-cell interference power. Similarly, the interference power measured on a third NZP CSI RS time-frequency resource by the UE 1 is actually a sum of an interference power of the UE 3 and the inter-cell interference power, that is, $I_3=y_3+I_0$, where $y_3$ is the interference power of the UE 3. Therefore, $I_{UE1}=I_2+I_3=y_2+y_3+2I_0$, that is, the inter-cell interference is repeatedly counted. As a result, the interference power obtained by the UE 1 is inaccurate. In addition, a power for sending a CSI RS to the terminal by the network device is different from a power for transmitting downlink data to the terminal by the network device. This also makes the foregoing interference power calculation inaccurate, thereby making CQI calculation inaccurate.

SUMMARY

Embodiments of this application provide an interference power measurement method and a device, to resolve a prior-art problem that an interference power measured by a terminal is inaccurate.

According to a first aspect, an interference power measurement method is provided, where the method includes:

receiving, by a terminal, first signaling that carries first indication information, where the first indication information is used to indicate n first channel state information-reference signal CSI RS resources, a $j^{th}$ first CSI RS resource is associated with a power parameter $P_{c,j}$, the power parameter $P_{c,j}$ is a ratio of an EPRE of a downlink shared channel to an EPRE of the $j^{th}$ first CSI RS resource, j=1, 2, ..., n, and n is a positive integer; and sending, by the terminal, a channel quality indicator CQI, where the CQI is determined based on a total interference power, the total interference power is a linear weighting result of an interference power measured on each of the n first CSI RS resources and an interference power $I_0$ measured on a zero power CSI RS resource, a weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

According to the foregoing method, the terminal receives the first signaling that carries the first indication information, where the first indication information is used to indicate the n first CSI RS resources, and the $j^{th}$ first CSI RS resource is associated with the power parameter $P_{c,j}$. The terminal sends the CQI, where the CQI is determined based on the total interference power. The total interference power is the linear weighting result of the interference power measured on each of the n first CSI RS resources and the interference power $I_0$ measured on the zero power CSI RS resource. The weighting coefficient of the interference power $I_j$ measured on the $j^{th}$ first CSI RS resource is the function of the power parameter $P_{c,j}$, and the weighting coefficient of $I_0$ is the function of $$1 - \sum_{j=1}^{n} P_{c,j}.$$

Therefore, the terminal can relatively accurately measure an interference power, and further obtain an accurate CQI, thereby improving PDSCH transmission performance.

In one embodiment, the total interference power is:

$$I = \sum_{j=1}^{n} P_{c,j} I_j + I_0 \left(1 - \sum_{j=1}^{n} P_{c,j}\right).$$

According to the foregoing formula, the terminal can obtain a relatively accurate interference power, and further obtain an accurate CQI, thereby improving PDSCH transmission performance.

In one embodiment, the n first CSI RS resources are determined from N non zero power CSI RS resources, and 1≤n≤N. The terminal receives second signaling, where the second signaling is used to configure the N non zero power CSI RS resources and a power parameter associated with each non zero power CSI RS resource.

According to the foregoing method, the terminal can determine, by using the second signaling and the first indication information, the n first CSI RS resources and a power parameter associated with each first CSI RS resource, and then calculate the total interference power according to the foregoing formula.

In one embodiment, the first indication information is further used to indicate m second CSI RS resources. The m second CSI RS resources are determined from the N non zero CSI RS resources. The m second CSI RS resources are used to measure a channel coefficient. m is a positive integer, and 1≤n+m≤N. The CQI is determined based on the total interference power and the channel coefficient.

According to the foregoing method, the terminal can determine the m second CSI RS resources by using the second signaling and the first indication information, to measure the channel coefficient.

In one embodiment, the first signaling further includes second indication information. The second indication information is used to indicate a power parameter associated with each first CSI RS resource. $P_{c,j}$ meets $$\sum_{j=1}^{n} P_{c,j} = 1.$$

It should be understood that a network device may configure only an NZP CSI RS resource as a CSI IM resource for the terminal to measure interference, and does not need to configure a ZP CSI RS resource. To resolve a problem that inter-cell interference is repeatedly counted on a plurality of NZP CSI RS resources, the network device notifies, by using the first signaling, the terminal of the power parameter associated with each first CSI RS resource, to meet a requirement of a dynamic change of a quantity of paired terminals. This ensures that the terminal can relatively accurately measure an interference power, and further obtain an accurate CQI, thereby improving PDSCH transmission performance.

In one embodiment, the network device may configure all power parameters $P_{c,j}$ to be a same power parameter, that is, $P_{c,1}=P_{c,2}= \ldots =P_{c,n}=P$. In this case, the power parameter is characterized in that a value of the power parameter is equal to a reciprocal of a quantity of paired terminals of a target terminal. In addition, a power parameter associated with a second CSI RS resource is also equal to P. To be specific, a power parameter of each of the n first CSI RS resources is equal to a power parameter of each of the m second CSI RS resources. Therefore, that the network device notifies, by using the first signaling, the terminal of the power parameter associated with each first CSI RS resource is equivalent to the following: the network device notifies, by using the first signaling, the terminal of the power parameter associated with each second CSI RS resource. Therefore, in other words, the power parameter notified of in the first signaling is associated with the second CSI RS resource. In addition, in a next-generation communications system, there may be a maximum of 8 or 12 paired terminals. Therefore, the power parameter indicated by the second indication information may be indicated by using three bits or four bits. If a quantity of paired terminals may further increase or decrease, a quantity of to-be-used bits may change accordingly. Therefore, in this application, a quantity of bits used in the second indication information is not limited herein.

In one embodiment, the first signaling is downlink control information DCI signaling.

In one embodiment, the second signaling is radio resource control RRC signaling or multiple access layer control element MAC CE signaling.

According to a second aspect, an interference power measurement method is provided, where the method includes:

sending, by a network device, first signaling that carries first indication information, where the first indication information is used to indicate n first CSI RS resources, a $j^{th}$ first CSI RS resource is associated with a power parameter $P_{c,j}$, the power parameter $P_{c,j}$ is a ratio of an EPRE of a downlink shared channel to a transmit power on each resource element EPRE of the $j^{th}$ first CSI RS resource, j=1, 2, . . . , n, and n is a positive integer; and receiving, by the network device, a channel quality indicator CQI sent by a terminal, where the CQI is determined based on a total interference power, the total interference power is a linear weighting result of an interference power measured on each of the n first CSI RS resources and an interference power $I_0$ measured on a zero power CSI RS resource, a weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

According to the foregoing method, the network device sends the first signaling that carries the first indication information, where the first indication information is used to indicate the n first CSI RS resources, and the $j^{th}$ first CSI RS resource is associated with the power parameter $P_{c,j}$. The network device receives the CQI sent by the terminal, where the CQI is determined based on the total interference power. The total interference power is the linear weighting result of the interference power measured on each of the n first CSI RS resources and the interference power $I_0$ measured on the zero power CSI RS resource. The weighting coefficient of the interference power $I_j$ measured on the $j^{th}$ first CSI RS resource is the function of the power parameter $P_{c,j}$, and the weighting coefficient of $I_0$ is the function of $$1 - \sum_{j=1}^{n} P_{c,j}.$$

Therefore, the terminal can relatively accurately measure an interference power, and further obtain an accurate CQI, thereby improving PDSCH transmission performance.

In one embodiment, the total interference power is:

$$I = \sum_{j=1}^{n} P_{c,j} I_j + I_0 \left(1 - \sum_{j=1}^{n} P_{c,j}\right).$$

According to the foregoing formula, the terminal can obtain a relatively accurate interference power, and further obtain an accurate CQI, thereby improving PDSCH transmission performance.

In one embodiment, the n first CSI RS resources are determined from N non zero power CSI RS resources, and 1≤n≤N. The network device sends second signaling, where the second signaling is used to configure the N non zero power CSI RS resources and a power parameter associated with each of the non zero power CSI RS resources.

According to the foregoing method, the terminal can determine, by using the second signaling and the first indication information, the n first CSI RS resources and a power parameter associated with each first CSI RS resource, and then calculate the total interference power according to the foregoing formula.

In one embodiment, the first indication information is further used to indicate m second CSI RS resources. The m second CSI RS resources are determined from the N non zero CSI RS resources. m is a positive integer, and 1≤n+m≤N. The CQI is determined based on the total interference power and a channel coefficient.

According to the foregoing method, the terminal can determine the m second CSI RS resources by using the second signaling and the first indication information, to measure the channel coefficient.

In one embodiment, the first signaling further includes second indication information. The second indication information is used to indicate a power parameter associated with each first CSI RS resource. $P_{c,j}$ meets $$\sum_{j=1}^{n} P_{c,j} = 1.$$

According to the foregoing method, when the network device may configure only an NZP CSI RS resource as a CSI IM resource for the terminal to measure interference, and does not need to configure a ZP CSI RS resource, the network device notifies, by using the first signaling, the terminal of the power parameter associated with each first CSI RS resource, to meet a requirement of a dynamic change of a quantity of paired terminals. This ensures that the terminal can relatively accurately measure an interference power, and further obtain an accurate CQI, thereby improving PDSCH transmission performance.

In one embodiment, the network device may configure all power parameters $P_{c,j}$ to be a same power parameter, that is, $P_{c,1}=P_{c,2}=\ldots=P_{c,n}=P$. In this case, the power parameter is characterized in that a value of the power parameter is equal to a reciprocal of a quantity of paired terminals of a target terminal. In addition, a power parameter associated with a second CSI RS resource is also equal to P. To be specific, a power parameter of each of the n first CSI RS resources is equal to a power parameter of each of the m second CSI RS resources. Therefore, that the network device notifies, by using the first signaling, the terminal of the power parameter associated with each first CSI RS resource is equivalent to the following: the network device notifies, by using the first signaling, the terminal of the power parameter associated with each second CSI RS resource. Therefore, in other words, the power parameter notified of in the first signaling is associated with the second CSI RS resource.

In one embodiment, the first signaling is DCI signaling.

In one embodiment, the second signaling is RRC signaling or MAC CE signaling.

According to a third aspect, an embodiment of this application further provides a network device. For example, the network device may be a base station. The network device has a function of implementing behavior of the network device in the foregoing method examples. The function may be implemented by using hardware, or implemented by executing corresponding software by the hardware. The hardware or the software includes one or more modules corresponding to the foregoing function.

In one embodiment, a structure of the network device includes a sending unit and a receiving unit. These units may execute a corresponding function in the foregoing method examples. For details, refer to detailed descriptions in the method examples. Details are not described herein.

In one embodiment, a structure of the network device includes a transceiver and a processor. The transceiver is configured to communicate and interact with a terminal, and the processor is configured to support the network device in executing a corresponding function in the foregoing method. The network device may further include a memory. The memory is coupled to the processor. The memory stores a program instruction and data required by the network device.

According to a fourth aspect, an embodiment of the present invention further provides a terminal. The terminal has a function of implementing behavior of the terminal in the foregoing method examples. For example, the terminal may be UE. The function may be implemented by using hardware, or implemented by executing corresponding software by the hardware. The hardware or the software includes one or more modules corresponding to the foregoing function.

In one embodiment, a structure of the terminal includes a receiving unit and a sending unit. These units may execute a corresponding function in the foregoing method examples. For details, refer to detailed descriptions in the method examples. Details are not described herein.

In one embodiment, a structure of the terminal includes a transceiver and a processor. The transceiver is configured to communicate and interact with a network device, and the processor is configured to support the terminal in executing a corresponding function in the foregoing method. The terminal may further include a memory. The memory is coupled to the processor. The memory stores a program instruction and data required by the terminal.

According to a fifth aspect, an embodiment of this application further provides a communications system. The communications system includes a network device and a terminal.

According to a sixth aspect, an embodiment of this application further provides a first non-transient computer storage medium, and the first non-transient computer storage medium stores a computer-executable instruction. The computer-executable instruction is used to perform the foregoing interference power measurement method of the network device in this application.

According to a seventh aspect, an embodiment of this application further provides a second non-transient computer storage medium, and the second non-transient computer storage medium stores a computer-executable instruction. The computer-executable instruction is used to perform the foregoing interference power measurement method of the terminal in this application.

According to an eighth aspect, an embodiment of this application further provides a first computer program product. The computer program product includes a computer program stored in the foregoing first non-transient computer storage medium. The computer program includes a program instruction. When the program instruction is executed by a computer, the computer is enabled to perform the foregoing interference power measurement method in this application.

According to a ninth aspect, an embodiment of this application further provides a second computer program product. The computer program product includes a computer program stored in the foregoing second non-transient computer storage medium. The computer program includes a program instruction. When the program instruction is executed by a computer, the computer is enabled to perform the foregoing interference power measurement method in this application.

According to the embodiments of this application, a network-side device sends the first signaling that carries the first indication information, where the first indication information is used to indicate the n first CSI RS resources, and the $j^{th}$ first CSI RS resource is associated with the power parameter $P_{c,j}$. The terminal sends the CQI, where the CQI is determined based on the total interference power. The total interference power is the linear weighting result of the interference power measured on each of the n first CSI RS resources and the interference power $I_0$ measured on the zero power CSI RS resource. The weighting coefficient of the interference power $I_j$ measured on the $j^{th}$ first CSI RS resource is the function of the power parameter $P_{c,j}$, and the weighting coefficient of $I_0$ is the function of $$1-\sum_{j=1}^{n}P_{c,j}.$$

Therefore, the terminal can relatively accurately measure an interference power, and further obtain an accurate CQI, thereby improving PDSCH transmission performance.

DESCRIPTION OF EMBODIMENTS

The following describes the embodiments of this application with reference to accompanying drawings.

Technologies described in this application may be applied to wireless communications systems that use various radio access technologies, for example, systems that use access technologies such as code division multiple access (CDMA), frequency division multiple access (FDMA), time division multiple access (TDMA), orthogonal frequency division multiple access (OFDMA), and single carrier-frequency division multiple access (SC-FDMA). The technologies are further applicable to subsequent evolved systems such as a 5th generation 5G (which may alternatively be referred to as new radio (NR)) communications system.

A network element in the embodiments of this application includes a network device and a terminal. The network device is an access device that is used by a terminal device to wirelessly connect to a mobile communications system.

The network device may be a base station (NodeB), an evolved base station (eNodeB), a base station in a 5G mobile communications system, a base station in a future mobile communications system, an access node in a Wi-Fi system, or the like. A specific technology and a specific device form used by the network device are not limited in the embodiments of this application.

The terminal may alternatively be referred to as a terminal device (Terminal equipment), user equipment (UE), a mobile station (MS), a mobile terminal (MT), and the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, and the like.

When the network device sends downlink data to the terminal on a configured time-frequency resource, the network device may simultaneously send downlink data to a plurality of other terminals on the same time-frequency resource. The plurality of other terminals are referred to as paired terminals of the terminal. To improve downlink data transmission performance, the terminal needs to feed back a CQI. The CQI is determined based on a channel coefficient from the network device to the terminal and an interference power received by the terminal. The channel coefficient is obtained by the terminal by performing measurement on a CSI RS resource configured for the terminal by the network device. The interference power is obtained by the terminal by performing measurement on a CSI IM resource configured for the terminal by the network device. If the CSI IM resource is a non zero power CSI RS resource used by a paired terminal of the terminal to measure a channel coefficient of the paired terminal, an interference power measured on each CSI IM resource includes an interference power of the paired terminal corresponding to the CSI IM resource. In some scenarios, the interference power further includes an inter-cell interference power. The CSI RS resource that is configured for the terminal to measure the channel coefficient and the CSI IM resource that is configured for the terminal to measure interference occupy different time-frequency-code resources.

In actual application, an energy per resource element (EPRE) of a CSI RS sent to a terminal by a network device may be different from an EPRE of a physical downlink shared channel (PDSCH) subsequently sent to the terminal by the network device. The energy per resource element is a transmit power on each resource element (RE). To enable the terminal to obtain a more accurate CQI, the terminal needs to be notified of a ratio $P_c = P_{data}/P_{rs}$ of a transmit power $P_{rs}$ of the CSI RS on each RE to a transmit power $P_{data}$ of the PDSCH on each RE. In this way, the terminal may calculate a power of received data on the PDSCH based on a measured channel coefficient and $P_c$, or calculate, based on a measured interference power and $P_c$, an interference power corresponding to the PDSCH.

Specifically, a power parameter $P_{c,j}$ associated with a $j^{th}$ CSI RS resource is used as an example. $P_{c,j}$ is a ratio of an EPRE of a downlink shared channel to an EPRE of the $j^{th}$ CST RS resource.

One resource unit is determined by one orthogonal frequency division multiplexing (OFDM) symbol in time domain and one subcarrier in frequency domain, and is a basic time-frequency resource unit in a current communications system. Both the CSI RS and the PDSCH may occupy several REs.

Figure 2:
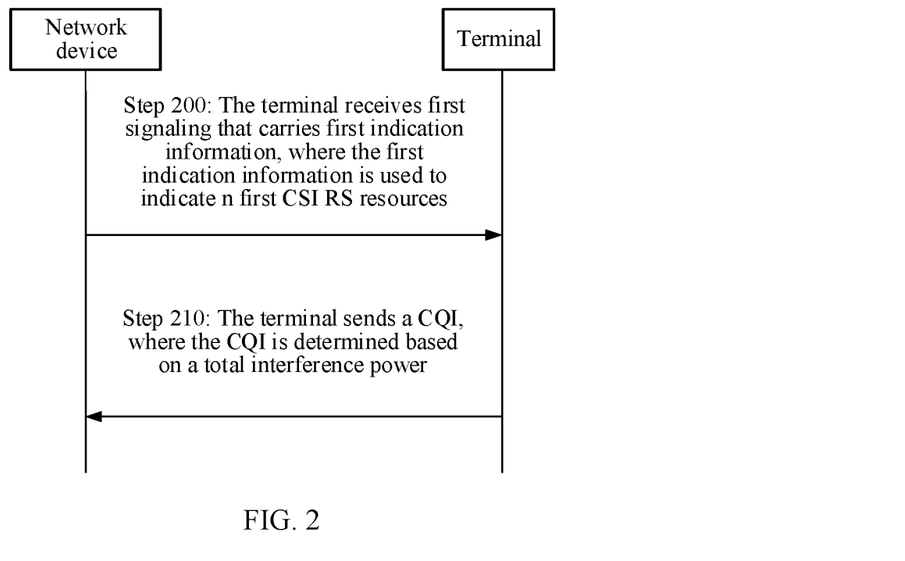
FIG. 2 is an overview flowchart of interference power measurement according to an embodiment of this application.

As shown in FIG. 2, an embodiment of this application provides an interference power measurement method, to resolve a prior-art problem that an interference power measured by a terminal is inaccurate. The method includes the following operations.

Operation 200: A terminal receives first signaling that carries first indication information, where the first indication information is used to indicate n first CSI RS resources.

A $j^{th}$ first CSI RS resource is associated with a power parameter $P_{c,j}$. The power parameter $P_{c,j}$ is a ratio of an EPRE of a downlink shared channel to an EPRE of the $j^{th}$ first CSI RS resource. j=1, 2, . . . , n, and n is a positive integer.

In one embodiment, the first signaling is downlink control information (DCI) signaling.

Operation 210: The terminal sends a CQI.

The CQI is determined based on a total interference power. The total interference power is a linear weighting result of an interference power measured on each of then first CSI RS resources and an interference power $I_0$ measured on a zero power CSI RS resource. A weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

Specifically, the terminal may measure an interference power on each first CSI RS resource. In this case, the obtained interference power includes an interference power of a paired terminal corresponding to the first CSI RS resource. The paired terminal corresponding to the first CSI RS resource measures a channel coefficient of the paired terminal on the first CSI RS resource. In some scenarios, the obtained interference power further includes an inter-cell interference power.

Figure 3:
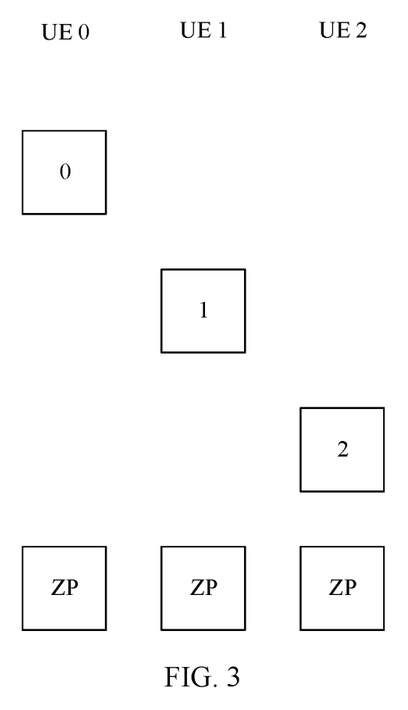
FIG. 3 is a schematic diagram of a CSI IM resource and a ZP CSI RS resource configured for a terminal by a network device according to an embodiment of this application.

In addition, a network device may further configure a zero power (ZP) CSI RS resource for the terminal. The ZP CSI RS resource is used to measure the inter-cell interference power $I_0$. Specifically, the network device may configure the ZP CSI RS resource for the terminal by using radio resource control (RRC) signaling. As shown in FIG. 3, a network device transmits downlink data to UE 0, UE 1, and UE 2 on a same time-frequency resource. That is, the UE 1 and the UE 2 are paired terminals of the UE 0 on the time-frequency resource. It is assumed that a CSI RS resource configured for UE k by the network device is an NZP CSI RS resource k, where k=0, 1, 2. Therefore, for the UE 0, an NZP CSI RS resource 1 and a CSI RS resource 2 are two first CSI RS resources. In addition, the network device further configures a ZP CSI RS resource for the terminal by using RRC signaling, as shown in FIG. 3.

In one embodiment, the total interference power is:

$$I = \sum_{j=1}^{n} P_{c,j} I_j + I_0 \left(1 - \sum_{j=1}^{n} P_{c,j}\right).$$

n represents a quantity of the first CSI RS resources, and is also a quantity of paired terminals corresponding to the current terminal. The interference power measured on each first CSI RS resource includes two parts: the interference power of a paired terminal corresponding to the first CSI RS resource, and an inter-cell interference power. For example, $I_j=y_j+I_0 (j=1, 2, \ldots, n)$, where $y_j$ represents an interference power of a paired terminal that is measured on a $j^{th}$ CSI RS resource, and $P_{c,j}=P_{pdsch,j}/y_j$. Therefore, $P_{c,j}I_j$ includes a power of interference caused to the current terminal when the network device sends a PDSCH to the paired terminal, and $$\sum_{j=1}^{n} P_{c,j}I_j$$

includes a sum of powers of interference caused to the current terminal by n paired terminals. However, the inter-cell interference $I_0$ is counted in $$\sum_{j=1}^{n} P_{c,j}I_j$$

for a plurality of times, and therefore $$I_0 \left( \sum_{j=1}^{n} P_{c,j} \right)$$

needs to be subtracted to ensure that the inter-cell interference is counted only once.

This embodiment of this application proposes, but is not limited to, the following two methods for determining the power parameter $P_{c,j}$.

Method 1:

The terminal receives second signaling, where the second signaling is used to configure N non zero power CSI RS resources and a power parameter associated with each non zero power CSI RS resource.

Specifically, the second signaling is RRC signaling or multiple access layer control element (MAC CE) signaling.

In this case, the n first CSI RS resources are determined from the N non zero power CSI RS resources, and $1 \leq n \leq N$.

Therefore, the terminal can determine, by using the second signaling and the first indication information, the n first CSI RS resources and a power parameter associated with each first CSI RS resource, and then calculate the total interference power according to the foregoing formula.

Further, in one embodiment, the first indication information is further used to indicate m second CSI RS resources. The m second CSI RS resources are determined from the N non zero CSI RS resources. The m second CSI RS resources are used by the current terminal to measure a channel coefficient. m is a positive integer, and $1 \leq n+m \leq N$.

For example, it is assumed that m=1, and a power parameter associated with the second CSI RS resource is $P_c$. In this case, the terminal may measure the channel coefficient H (where the channel coefficient H includes impact made by a transmit power of the second CSI RS resource) based on the second CSI RS resource. With reference to the total interference power I obtained according to the foregoing formula, a signal to interference plus noise ratio (SINR) is calculated as follows:

$$SINR = \frac{P_c|H|^2}{I+\sigma^2},$$

where

σ is a known constant and represents a noise power.

Therefore, according to Method 1, the terminal can relatively accurately measure an interference power, and further obtain an accurate CQI, thereby improving PDSCH transmission performance.

Method 2:

The first signaling further includes second indication information. The second indication information is used to indicate a power parameter associated with each first CSI RS resource. $P_{c,j}$ meets $$\sum_{j=1}^{n} P_{c,j} = 1.$$

In this case, the power parameter $P_{c,j}$ is dynamically configured. In $$I = \sum_{j=1}^{n} P_{c,j}I_j + I_0 \left( 1 - \sum_{j=1}^{n} P_{c,j} \right),$$

the second item is 0. Therefore, $$I = \sum_{j=1}^{n} P_{c,j}I_j.$$

That is, according to Method 2, the network device may configure only an NZP CSI RS resource as a CSI IM resource for the terminal to measure interference, and does not need to configure a ZP CSI RS resource. In this case, a quantity of paired terminals in each transmission unit may change. Therefore, to resolve a problem that the inter-cell interference is repeatedly counted on a plurality of NZP CSI RS resources, the power parameter $P_{c,j}$ needs to be dynamically notified of by using dynamic signaling (DCI), to meet a requirement of a dynamic change of the quantity of paired terminals. In addition, the power parameter $P_{c,j}$ that is dynamically notified of meets $$\sum_{j=1}^{n} P_{c,j} = 1.$$

In one embodiment, the network device may configure all power parameters $P_{c,j}$ to be a same power parameter, that is, $P_{c,1}=P_{c,2}= \ldots =P_{c,n}=P$. In this case, the power parameter is characterized in that a value of the power parameter is equal to a reciprocal of a quantity of paired terminals of a target terminal. In addition, a power parameter associated with a second CSI RS resource is also equal to P. To be specific, a power parameter of each of the n first CSI RS resources is equal to a power parameter of each of the m second CSI RS resources. In addition, in a next-generation communications system, there may be a maximum of 8 or 12 paired terminals. Therefore, the power parameter indicated by the second indication information may be indicated by using three bits or four bits. If a quantity of paired terminals may further increase or decrease, a quantity of to-be-used bits may change accordingly. Therefore, in this application, a quantity of bits used in the second indication information is not limited herein.

For example, when UE 1, UE 2, and UE 3 are paired, if the UE 1 is used as a target terminal, a quantity of paired terminals that are paired with the UE 1 is two. In this case, the network device may configure the power parameter indicated by the second indication information as ½, that is, $P_{c,2}=P_{c,3}=½$. Therefore, $$\frac{P_2}{y_2} = \frac{P_3}{y_3} = 1/2,$$

where $P_2$ represents an EPRE of a PDSCH corresponding to the UE 2, that is, $P_{pdsch,2}$; and $P_3$ represents an EPRE of a PDSCH corresponding to the UE 3, that is, $P_{pdsch,3}$. $I_2=y_2+I_0$, $I_3=y_3+I_0$, and therefore an interference power calculated by the UE 1 is $$I = \frac{I_2 + I_3}{2} = \frac{2P_2 + 2P_3 + 2I_0}{2} = P_2 + P_3 + I_0.$$

If the UE 2 is used as a target terminal, the network device may configure the power parameter indicated by the second indication information as ½, that is, $P_{c,1}=P_{c,3}=½$. Therefore, $P_1/y_1=P_3/y_3=½$, where $P_1$ represents an EPRE of a PDSCH corresponding to the UE 1, that is, $P_{pdsch,1}$; and $P_3$ represents the EPRE of the PDSCH corresponding to the UE 3, that is, $P_{pdsch,3}$. $I_1=y_1+I_0$, $I_3=y_3+I_0$, and therefore an interference power calculated by the UE 2 is $$I = \frac{I_1 + I_3}{2} = \frac{2P_1 + 2P_3 + 2I_0}{2} = P_1 + P_3 + I_0.$$

It can be learned that, to enable each UE to correctly calculate an interference power, the network device configures a same power parameter for all terminals. When four terminals are paired, the network device also configures a same power parameter for all the terminals. In this case, P=⅓. Therefore, by using the foregoing method for dynamically configuring the parameter $P_{c,j}$, it can be ensured that, when no ZP CSI RS resource is used and only an NZP CSI RS resource is used to measure interference, the terminal can relatively accurately measure an interference power, and further obtain an accurate CQI, thereby improving PDSCH transmission performance.

In addition, the terminal may alternatively receive third signaling. The third signaling is used to configure N non zero power CSI RS resources. In this case, the third signaling includes no power parameter associated with each of the N non zero power CSI RS resources.

Specifically, the third signaling is RRC signaling or MAC CE signaling. In this case, the n first CSI RS resources are determined from the N non zero power CSI RS resources, and 1≤n≤N.

The terminal can determine the n first CSI RS resources by using the third signaling and the first indication information, determine, by using the second indication information, the power parameter associated with each first CSI RS resource, and calculate the total interference power.

Further, the first indication information is further used to indicate m second CSI RS resources. The m second CSI RS resources are determined from the N non zero CSI RS resources. The m second CSI RS resources are used to measure a channel coefficient. m is a positive integer, and 1≤n+m≤N.

For example, when a terminal has n paired terminals, the terminal determines n first CSI RS resources by using a third instruction, and a network device may configure a power parameter indicated by second indication information as 1/n. In this case, a power of total interference caused to the terminal is:

$$I = \frac{I_1 + I_2 + \ldots + I_n}{n},$$

where $I_1, \ldots, I_n$ are interference powers measured on the n first CSI RS resources by the terminal.

It is assumed that m=1, and a power parameter associated with the second CSI RS resource is $P_c$. The terminal measures the channel coefficient H (where the channel coefficient H includes impact made by a transmit power of the second CSI RS resource) on the second CSI RS resource, an SINR is calculated as follows:

$$SINR = \frac{P_c|H|^2}{I + \sigma^2},$$

where σ is a known constant and represents a noise power.

In this way, by receiving the power parameter that is dynamically notified of by the network device, the terminal can adapt to the dynamic change of the quantity of paired terminals, and obtain an accurate total interference power and an accurate CQI through calculation, thereby improving PDSCH transmission performance.

Figure 4:
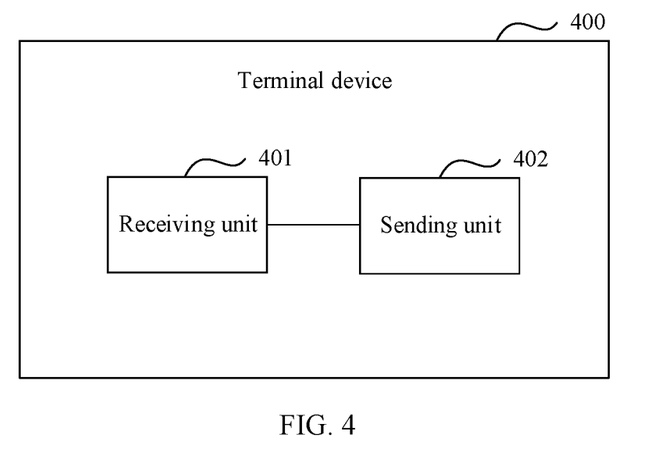
FIG. 4 is a first schematic structural diagram of a terminal according to an embodiment of this application.

Based on the foregoing embodiment, an embodiment of this application provides a terminal that is configured to implement the interference power measurement method shown in FIG. 2. As shown in FIG. 4, the terminal 400 includes: a receiving unit 401 and a sending unit 402.

The receiving unit 401 is configured to receive first signaling that carries first indication information. The first indication information is used to indicate n first channel state information-reference signal CSI RS resources. A $j^{th}$ first CSI RS resource is associated with a power parameter $P_{c,j}$. The power parameter $P_{c,j}$ is a ratio of an EPRE of a downlink shared channel to an EPRE of the $j^{th}$ first CSI RS resource. j=1, 2, . . . , n, and n is a positive integer.

The sending unit 402 is configured to send a channel quality indicator CQI. The CQI is determined based on a total interference power. The total interference power is a linear weighting result of an interference power measured on each of the n first CSI RS resources and an interference power I measured on a zero power CSI RS resource. A weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

For details, refer to detailed descriptions in the method example shown in FIG. 2. Details are not described herein.

It should be noted that, in this embodiment of this application, unit division is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, and an optical disc.

Figure 5:
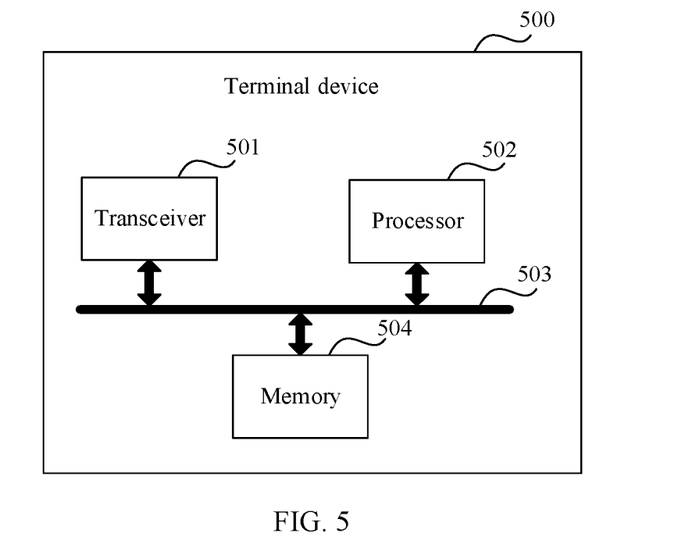
FIG. 5 is a second schematic structural diagram of a terminal according to an embodiment of this application.

Based on the foregoing embodiments, an embodiment of this application further provides a terminal that is configured to implement the interference power measurement method shown in FIG. 2 and has a function of the terminal 400 shown in FIG. 4. As shown in FIG. 5, the terminal device includes: a transceiver 501, a processor 502, a bus 503, and a memory 504.

The transceiver 501, the processor 502, and the memory 504 are connected to each other by using the bus 503. The bus 503 may be a PCI bus, an EISA bus, or the like. The bus may be classified into an address bus, a data bus, a control bus, and the like. For ease of representation, only one thick line is used to represent the bus in FIG. 5, but this does not mean that there is only one bus or only one type of bus.

The memory 504 is configured to store a program and the like. Specifically, the program may include program code, and the program code includes a computer operation instruction. The memory 504 may include a RAM, and may further include a non-volatile memory, for example, at least one magnetic memory. The processor 502 executes an application program stored in the memory 504, to implement the foregoing function and implement the interference power measurement method shown in FIG. 4.

When the program stored in the memory 504 is executed by the processor 502, the transceiver 501 is configured to receive first signaling that carries first indication information. The first indication information is used to indicate n first channel state information-reference signal CSI RS resources. A $j^{th}$ first CSI RS resource is associated with a power parameter $P_{c,j}$. The power parameter $P_{c,j}$ is a ratio of an EPRE of a downlink shared channel to an EPRE of the $j^{th}$ first CSI RS resource. j=1, 2, . . . , n, and n is a positive integer.

The transceiver 501 is further configured to send a channel quality indicator CQI. The CQI is determined based on a total interference power. The total interference power is a linear weighting result of an interference power measured on each of the n first CSI RS resources and an interference power $I_0$ measured on a zero power CSI RS resource. A weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

In one embodiment, the total interference power is:

$$I = \sum_{j=1}^{n} P_{c,j} I_j + I_0 \left(1 - \sum_{j=1}^{n} P_{c,j}\right).$$

In one embodiment, the n first CSI RS resources are determined from N non zero power CSI RS resources, and $1 \leq n \leq N$. The transceiver 501 is further configured to:

receive second signaling, where the second signaling is used to configure the N non zero power CSI RS resources and a power parameter associated with each of the non zero power CSI RS resources.

In one embodiment, the first indication information is further used to indicate m second CSI RS resources. The m second CSI RS resources are determined from the N non zero CSI RS resources. The m second CSI RS resources are used to measure a channel coefficient. m is a positive integer, and $1 \leq n+m \leq N$. The CQI is determined based on the total interference power and the channel coefficient.

In one embodiment, the first signaling further includes second indication information. The second indication information is used to indicate a power parameter associated with each first CSI RS resource. $P_{c,j}$ meets $$\sum_{j=1}^{n} P_{c,j} = 1.$$

In one embodiment, the first signaling is downlink control information DCI signaling.

In one embodiment, the second signaling is RRC signaling or MAC CE signaling.

Figure 6:
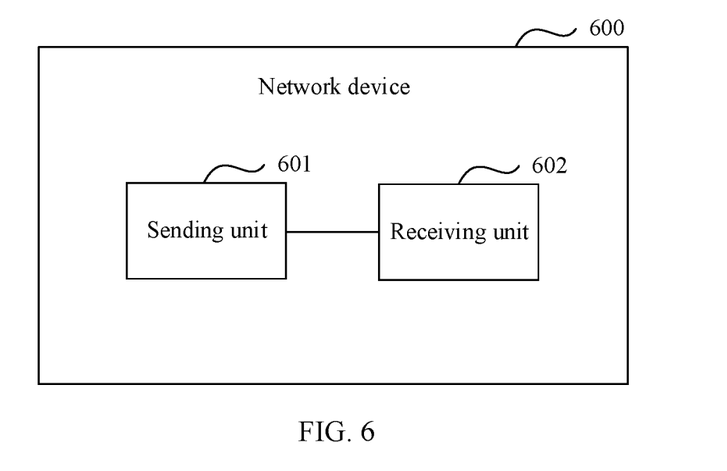
FIG. 6 is a first schematic structural diagram of a network device according to an embodiment of this application.

Based on the foregoing embodiments, an embodiment of this application provides a network device. As shown in FIG. 6, the network device 600 includes: a sending unit 601 and a receiving unit 602.

The sending unit 601 is configured to send first signaling that carries first indication information. The first indication information is used to indicate n first CSI RS resources. A $j^{th}$ first CSI RS resource is associated with a power parameter $P_{c,j}$. The power parameter $P_{c,j}$ is a ratio of an EPRE of a downlink shared channel to an EPRE of the $j^{th}$ first CSI RS resource. j=1, 2, . . . , n, and n is a positive integer.

The receiving unit 602 is further configured to receive a channel quality indicator CQI sent by the terminal. The CQI is determined based on a total interference power. The total interference power is a linear weighting result of an interference power measured on each of the n first CSI RS resources and an interference power $I_0$ measured on a zero power CSI RS resource. A weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

For details, refer to detailed descriptions in the method example shown in FIG. 2. Details are not described herein.

Figure 7:
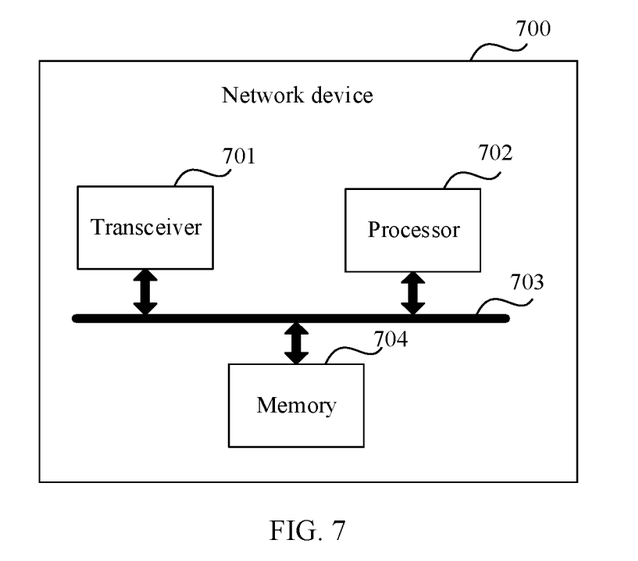
FIG. 7 is a second schematic structural diagram of a network device according to an embodiment of this application.

Based on the foregoing embodiments, an embodiment of this application further provides a network device that has a function of the network device 600 shown in FIG. 6. As shown in FIG. 7, the network device 700 includes: a transceiver 701, a processor 702, a bus 703, and a memory 704.

The transceiver 701, the processor 702, and the memory 704 are connected to each other by using the bus 703. The bus 703 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

The memory 704 is configured to store a program and the like. Specifically, the program may include program code, and the program code includes a computer operation instruction. The memory 704 may include a random access memory (RAM), and may further include a non-volatile memory, for example, at least one magnetic disk memory. The processor 702 executes an application program stored in the memory 704, to implement the foregoing function and implement the interference power measurement method shown in FIG. 4.

When the program stored in the memory 704 is executed by the processor 702, the transceiver 701 is configured to receive first signaling that carries first indication information. The first indication information is used to indicate n first channel state information-reference signal CSI RS resources. A $j^{th}$ first CSI RS resource is associated with a power parameter $P_{c,j}$. The power parameter $P_{c,j}$ is a ratio of an EPRE of a downlink shared channel to an EPRE of the $j^{th}$ first CSI RS resource. j=1, 2, . . . , n, and n is a positive integer.

The transceiver 701 is configured to receive a channel quality indicator CQI sent by the terminal. The CQI is determined based on a total interference power. The total interference power is a linear weighting result of an interference power measured on each of then first CSI RS resources and an interference power $I_0$ measured on a zero power CSI RS resource. A weighting coefficient of an interference power $I_j$ measured on the $j^{th}$ first CSI RS resource is a function of the power parameter $P_{c,j}$, and a weighting coefficient of $I_0$ is a function of $$1 - \sum_{j=1}^{n} P_{c,j}.$$

In one embodiment, the total interference power is:

$$I = \sum_{j=1}^{n} P_{c,j} I_j + I_0 \left(1 - \sum_{j=1}^{n} P_{c,j}\right).$$

In one embodiment, the n first CSI RS resources are determined from N non zero power CSI RS resources, and 1≤n≤N. The transceiver 701 is further configured to send second signaling. The second signaling is used to configure the N non zero power CSI RS resources and a power parameter associated with each of the non zero power CSI RS resources.

In one embodiment, the first indication information is further used to indicate m second CSI RS resources. The m second CSI RS resources are determined from the N non zero CSI RS resources. m is a positive integer, and 1≤n+m≤N.

The CQI is determined based on the total interference power and the channel coefficient.

In one embodiment, the first signaling further includes second indication information. The second indication information is used to indicate a power parameter associated with each first CSI RS resource. $P_{c,j}$ meets $$\sum_{j=1}^{n} P_{c,j} = 1.$$

In one embodiment, the first signaling is DCI signaling.

In one embodiment, the second signaling is RRC signaling or MAC CE signaling.

In conclusion, according to the embodiments of this application, the network-side device sends the first signaling that carries the first indication information, where the first indication information is used to indicate the n first CSI RS resources. The $j^{th}$ first CSI RS resource is associated with the power parameter $P_{c,j}$. The terminal sends the CQI, where the CQI is determined based on the total interference power. The total interference power is the linear weighting result of the interference power measured on each of the n first CSI RS resources and the interference power $I_0$ measured on the zero power CSI RS resource. The weighting coefficient of the interference power $I_j$ measured on the $j^{th}$ first CSI RS resource is the function of the power parameter $P_{c,j}$, and the weighting coefficient of $I_0$ is the function of $$1 - \sum_{j=1}^{n} P_{c,j}.$$

Therefore, the terminal can relatively accurately measure an interference power, and further obtain an accurate CQI, thereby improving PDSCH transmission performance.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to embodiments of this application without departing from the spirit and scope of this application. This application is also intended to cover these modifications and variations to embodiments of this application provided that they fall within the scope of protection defined by the following claims and their equivalent technologies.

What is claimed is:

1. An interference power measurement method, comprising:
receiving, by a terminal, first signaling that carries first indication information, wherein the first indication information indicates n first channel state information-reference signal (CSI RS) resources, a $j^{th}$ first CSI RS resource is associated with a power parameter $P_{c,j}$, the power parameter $P_{c,j}$ is a ratio of a transmit power on each resource element (EPRE) of a downlink shared channel to an EPRE of the $j^{th}$ first CSI RS resource, j=1,2, . . . ,n, and n is a positive integer; and
sending, by the terminal, a channel quality indicator (CQI), wherein the CQI is determined based on a total interference power, wherein the total interference power includes a linear weighting result of an interference power measured on each of the n first CSI RS resources, wherein a weighting coefficient of an interference power $I_j$ measured on the $j^{th}$ first CSI RS resource is associated with the power parameter $P_{c,j}$.

2. The interference power measurement method according to claim 1, wherein the total interference power is a function of:

$$\sum_{j=1}^{n} P_{c,j} I_j + I_0 \left(1 - \sum_{j=1}^{n} P_{c,j}\right).$$

wherein $I_0$ is an interference power measured on a zero power CSI RS resource.

3. The interference power measurement method according to claim 1, wherein the n first CSI RS resources are determined from N non zero power CSI RS resources, and 1≤n≤N ; and
the interference power measurement method further comprises:
receiving, by the terminal, a second signaling, wherein the second signaling is used to configure the N non zero power CSI RS resources and a power parameter associated with each of the N non zero power CSI RS resources.

4. The interference power measurement method according to claim 3, wherein the first indication information is further used to indicate m second CSI RS resources, the m second CSI RS resources are determined from the N non zero power CSI RS resources, the m second CSI RS resources are used to measure a channel coefficient, m is a positive integer, and 1≤n+m≤N; and
the CQI is determined based on the total interference power and the channel coefficient.

5. The interference power measurement method according to claim 1, wherein the first signaling further comprises a second indication information, the second indication information is used to indicate a power parameter associated with each first CSI RS resource, and $P_{c,j}$ meets $$\sum_{j=1}^{n} P_{c,j} = 1.$$

wherein $I_0$ is an interference power measured on a zero power CSI RS resource.

6. An interference power measurement method, comprising:
sending, by a network device, first signaling that carries a first indication information, wherein the first indication information indicates n first channel state information-reference signal (CSI RS) resources, a $j^{th}$ first CSI RS resource is associated with a power paramater $P_{c,j}$, the power parameter $P_{c,j}$ is a ratio of an transmit power on each resource element (EPRE) of a downlink shared channel to an EPRE of the $j^{th}$ first CSI RS resource, j=1, 2, . . . ,n, and n is a positive integer; and
receiving, by the network device, a channel quality indicator (CQI) sent by a terminal, wherein the CQI is determined based on a total interference power, wherein the total interference power includes a linear weighting result of an interference power measured on each of the n first CSI RS resources, wherein a weighting coefficient of an interference power $I_j$ measured on the $j^{th}$ first CSI RS resource is associated with the power parameter $P_{c,j}$.

7. The interference power measurement method according to claim 6, wherein the total interference power is:

$$\sum_{j=1}^{n} P_{c,j} I_j + I_0 \left(1 - \sum_{j=1}^{n} P_{c,j}\right).$$

wherein $I_0$ is an interferance power measured on a zero power CSI RS resource.

8. The interference power measurement method according to claim 6, wherein the n first CSI RS resources are determined from N non zero power CSI RS resources, and wherein 1≤n≤N; and the interference power measurement method further comprises:

sending, by the network device, a second signaling, wherein the second signaling is used to configure the N non zero power CSI RS resources and a power parameter associated with each of the N non zero power CSI RS resources.

9. The interference power measurement method according to claim 8, wherein the first indication information is further used to indicate m second CSI RS resources, the m second CSI RS resources are determined from the N non zero power CSI RS resources, m is a positive integer, and 1≤n+m≤N; and the CQI is determined based on the total interference power and a channel coefficient.

10. The interference power measurement method according to claim 6, wherein the first signaling further comprises a second indication information, the second indication information is used to indicate a power parameter associated with each first CSI RS resource, and $P_{c,j}$ meets $$\sum_{j=1}^{n} P_{c,j} = 1.$$

11. A terminal, comprising: a memory; a processor; and a transceiver; wherein the memory is coupled to the processor and stores instructions, which, when executed by the processor, cause the transceiver to receive first signaling that carries first indication information, wherein the first indication information indicates n first channel state information-reference signal (CSI RS) resources, a $j^{th}$ first CSI RS resource is associated with a power parameter $P_{c,j}$, the power parameter $P_{c,j}$ is a ratio of a transmit power on each resource element (EPRE) of a downlink shared channel to an EPRE of the $j^{th}$ first CSI RS resource, j= 1,2, . . . ,n, and wherein n is a positive integer; and send a channel quality indicator (CQI), wherein the CQI is determined based on a total interference power, wherein the total interference power includes a linear weighting result of an interference power measured on each of the n first CSI RS resources, wherein a weighting coefficient of an interference power $I_j$ measured on the $j^{th}$ first CSI RS resource is associated with the power parameter $P_{c,j}$.

12. The terminal according to claim 11, wherein the total interference power is:

$$\sum_{j=1}^{n} P_{c,j} I_j + I_0 \left(1 - \sum_{j=1}^{n} P_{c,j}\right).$$

wherein $I_0$ is an interference power measured on a zero power CSI RS resource.

13. The terminal according to claim 11, wherein the n first CSI RS resources are determined from N non zero power CSI RS resources, and 1≤n≤N ; and the transceiver is further configured to:

receive a second signaling, wherein the second signaling is used to configure the N non zero power CSI RS resources and a power parameter associated with each of the N non zero power CSI RS resources.

14. The terminal according to claim 13, wherein the first indication information is further used to indicate m second CSI RS resources, the m second CSI RS resources are determined from the N non zero power CSI RS resources, the m second CSI RS resources are used to measure a channel coefficient, m is a positive integer, and 1≤n+m≤M; and the CQI is determined based on the total interference power and the channel coefficient.

15. The terminal according to claim 11, wherein the first signaling further comprises second indication information, the second indication information indicate a power parameter associated with each first CSI RS resource, and $P_{c,j}$ meets $$\sum_{j=1}^{n} P_{c,j} = 1.$$

16. A network device, comprising: a memory, a processor, and a transceiver, wherein the memory is coupled to the processor and stores program instructions, which, when executed by the processor, cause the transceiver to send first signal that carries first indication information indicates n first channel state information-reference signal (CSI RS) resources, a $j^{th}$ first CSI RS resource is associated with a power parameter $P_{c,j}$, the power parameter $P_{c,j}$ is a ratio of an transmit power on each resource element (EPRE) of a downlink shared channel to an EPRE of the $j^{th}$ first CSI RS resource j=1, 2, . . . ,n, and n is a positive integer; and receive a channel quality indicator (CQI) sent by a terminal, wherein the CQI is determined based on a total interference power, wherein the total interference power is a linear weighting result of an interference power measured on each of the n first CSI RS resources, wherein a weighting coefficient of an interference power $I_j$ measured on the $j^{th}$ first CSI RS resource is associated with the power parameter $P_{c,j}$.

17. The network device according to claim 16, wherein the total interference power is a function of:

$$\sum_{j=1}^{n} P_{c,j} I_j + I_0 \left(1 - \sum_{j=1}^{n} P_{c,j}\right).$$

wherein $I_0$ is an interference power measured on a zero power CSI RS resource.

18. The network device according to claim 16, wherein the n first CSI RS resources are determined from N non zero power CSI RS resources, and 1≤n≤N; and the transceiver is further configured to send second signaling, wherein the second signaling configures the N non zero power CSI RS resources and a power parameter associated with each of the N non zero power CSI RS resources.

19. The network device according to claim 18, wherein the first indication information is further used to indicate m second CSI RS resources, the m second CSI RS resources are determined from the N non zero power CSI RS resources, m is a positive integer, and 1≤n+m≤N; and wherein the CQI is determined based on the total interference power and a channel coefficient.

20. The network device according to claim 16, wherein the first signaling further comprises a second indication information, wherein the second indication information is used to indicate a power parameter associated with each first CSI RS resource, and $P_{c,j}$ meets $$\sum_{j=1}^{n} P_{c,j} = 1.$$

21. A non-transitory computer-readable medium having instructions, which, when executed by one or more processors, cause the one or more processors to perform operation comprising:

receiving, by a terminal, first signaling that carries first indication information, wherein the first indication information indicates n first channel state information-reference signal (CSI RS) resources, a $j^{th}$ first CSI RS resource is associated with a power parameter $P_{c,j}$, the power parameter $P_{c,j}$ is a ratio of a transmit power on each resource element (EPRE) of a downlink shared channel to an EPRE of the $j^{th}$ first CSI RS resource, j=1,2, . . . ,n, and n is a positive integer; and sending, by the terminal, a channel quality indicator (CQI), wherein the CQI is determined based on a total interference power, wherein the total interference power includes a linear weighting result of an interference power measured on each of the n first CSI RS resources, wherein a weighting coefficient of an interference power $I_j$ measured on the $j^{th}$ first CSI RS resource is associated with the power parameter $P_{c,j}$.

22. The non-transitory computer-readable medium according to claim 21, wherein the total interference power is:

$$I = \sum_{j=1}^{n} P_{c,j} I_j + I_0 \left(1 - \sum_{j=1}^{n} P_{c,j}\right),$$

wherein $I_0$ is an interference power measured on a zero power CSI RS resource.

23. The non-transitory computer-readable medium according to claim 21, wherein the n first CSI RS resources are determined from N non zero power CSI RS resources, and 1≤n ≤N; and the operations further comprise:

receiving, by the terminal, second signaling, wherein the second signaling is used to configure the N non zero power CSI RS resources and a power parameter associated with each of the N non zero power CSI RS resources.

24. The non-transitory computer-readable medium according to claim 23, wherein the first indication information is further used to indicate m second CSI RS resources, the m second CSI RS resources are determined from the N non zero power CSI RS resources, the m second CSI RS resources are used to measure a channel coefficient, m is a positive integer, and 1≤n+m≤N; and the CQI is determined based on the total interference power and the channel coefficient.

25. The non-transitory computer-readable medium according to claim 21, wherein the first signaling further comprises second indication information, the second indication information is used to indicate a power parameter associated with each first CSI RS resource, and $P_{c,j}$ meets $$\sum_{j=1}^{n} P_{c,j} = 1.$$

26. A non-transitory computer-readable medium having instructions, which, when executed by one or more processors, cause the one or more processors to perform operations comprising:

sending, by a network device, first signaling that carries first indication information, wherein the first indication information indicates n first channel state information-reference signal (CSI RS) resources, a $j^{th}$ first CSI RS resource is associated with a power parameter $P_{c,j}$, the power parameter $P_{c,j}$ is a ratio of an EPRE of a downlink shared channel to an EPRE of the $j^{th}$ first CSI RS resource, j=1, 2, . . . ,n, and n is a positive integer; and receiving, by the network device, a channel quality indicator CQI sent by a terminal, wherein the CQI is determined based on a total interference power, wherein the total interference power includes a linear weighting result of an interference power measured on each of the n first CSI RS resources, wherein a weighting coefficient of an interference power $I_j$ measured on the $j^{th}$ first CSI RS resource is associated with the power parameter $P_{c,j}$.

27. The non-transitory computer-readable medium according to claim 26, wherein the total interference power is:

$$I = \sum_{j=1}^{n} P_{c,j} I_j + I_0 \left(1 - \sum_{j=1}^{n} P_{c,j}\right),$$

wherein $I_0$ is an interference power measured on a zero power CSI RS resource.

28. The non-transitory computer-readable medium according to claim 26, wherein the n first CSI RS resources are determined from N non zero power CSI RS resources, and 1≤n≤N; and the operations further comprise:

sending, by the network device, second signaling, wherein the second signaling is used to configure the N non zero power CSI RS resources and a power parameter associated with each of the N non zero power CSI RS resources.

29. The non-transitory computer-readable medium according to claim 28, wherein the first indication information is further used to indicate m second CSI RS resources, the m second CSI RS resources are determined from the N non zero power CSI RS resources, m is a positive integer, and 1≤n+m≤N; and the CQI is determined based on the total interference power and a channel coefficient.

30. The non-transitory computer-readable medium according to claim 26, wherein the first signaling further comprises second indication information, the second indication information is used to indicate a power parameter associated with each first CSI RS resource, and $P_{c,j}$ meets $$\sum_{j=1}^{n} P_{c,j} = 1.$$

UNITED STATES PATENT AND TRADEMARK OFFICE
CERTIFICATE OF CORRECTION

PATENT NO. : 11,196,494 B2
APPLICATION NO. : 16/714550
DATED : December 7, 2021
INVENTOR(S) : Xueru Li et al.

Page 1 of 2

It is certified that error appears in the above-identified patent and that said Letters Patent is hereby corrected as shown below:

In the Claims

In Claim 2, Column 20, Line 6-12, delete " $\sum_{j=1}^{n} P_{c,j} I_j + I_0 \left(1 - \sum_{j=1}^{n} P_{c,j}\right)$ " and insert -- $I = \sum_{j=1}^{n} P_{c,j} I_j + I_0 \left(1 - \sum_{j=1}^{n} P_{c,j}\right)$ --.

In Claim 7, Column 21, Line 3-9, delete " $\sum_{j=1}^{n} P_{c,j} I_j + I_0 \left(1 - \sum_{j=1}^{n} P_{c,j}\right)$ " and insert -- $I = \sum_{j=1}^{n} P_{c,j} I_j + I_0 \left(1 - \sum_{j=1}^{n} P_{c,j}\right)$ --.

In Claim 12, Column 22, Line 1-5, delete " $\sum_{j=1}^{n} P_{c,j} I_j + I_0 \left(1 - \sum_{j=1}^{n} P_{c,j}\right)$ " and insert -- $I = \sum_{j=1}^{n} P_{c,j} I_j + I_0 \left(1 - \sum_{j=1}^{n} P_{c,j}\right)$ --.

Signed and Sealed this
Seventh Day of June, 2022

*Katherine Kelly Vidal*

Katherine Kelly Vidal
*Director of the United States Patent and Trademark Office*

CERTIFICATE OF CORRECTION (continued)

In Claim 15, Column 22, Line 28-29, delete "the second indication information indicate a power parameter" and insert -- the second indication information is used to indicate a power parameter --.

In Claim 16, Column 22, Line 41-42, delete "cause the transceiver to send first signal that carries first indication information" and insert -- cause the transceiver to send first signaling that carries first indication information, wherein the first indication information --.

In Claim 17, Column 22, Line 60-65, delete " $\sum_{j=1}^{n} P_{c,j} I_j + I_0 \left(1 - \sum_{j=1}^{n} P_{c,j}\right)$ " and insert -- $I = \sum_{j=1}^{n} P_{c,j} I_j + I_0 \left(1 - \sum_{j=1}^{n} P_{c,j}\right)$ --.

In Claim 18, Column 23, Line 5, delete "wherein the second signaling configures" and insert -- wherein the second signaling is used to configure --.